United States Patent

[11] 3,612,672

| [72] | Inventor | Richard K. Carlso<br>Chicago, Ill. |
|---|---|---|
| [21] | Appl. No. | 854,486 |
| [22] | Filed | Sept. 2, 1969 |
| [45] | Patented | Oct. 12, 1971 |
| [73] | Assignee | Bell & Howell Company<br>Chicago, Ill. |

[54] APERTURE ASSEMBLY AND INTERMITTENT MECHANISM FOR A CAMERA
9 Claims, 4 Drawing Figs.

| [52] | U.S. Cl. | 352/221,<br>352/226 |
|---|---|---|
| [51] | Int. Cl. | G03b 1/48 |
| [50] | Field of Search | 352/221,<br>224, 226 |

[56] References Cited
UNITED STATES PATENTS

| 2,477,624 | 8/1949 | Kuehn | 352/226 |
|---|---|---|---|
| 3,244,472 | 4/1966 | Yasukawa | 352/221 X |

*Primary Examiner*—Louis R. Prince
*Assistant Examiner*—Joseph W. Roskos
*Attorney*—William F. Pinsak

ABSTRACT: An assembly having an aperture plate as a portion of a housing enclosing spring tensioned side guides for films, a cam actuated shuttle member having an angularly shaped claw portion which advances a film frame by frame, a spring biases the claw portion into intimate contact with the film, yet permits the claw to cam out of the film perforation on its return, and a driven shutter rotated by a prime mover having a pin located eccentrically thereon for operating between lugs on the shuttle member to provide advance and return movements of the claw in proper timing sequence with an exposure sector of the shutter.

Inventor:
Richard K. Carlson.

By William F. [signature] Atty

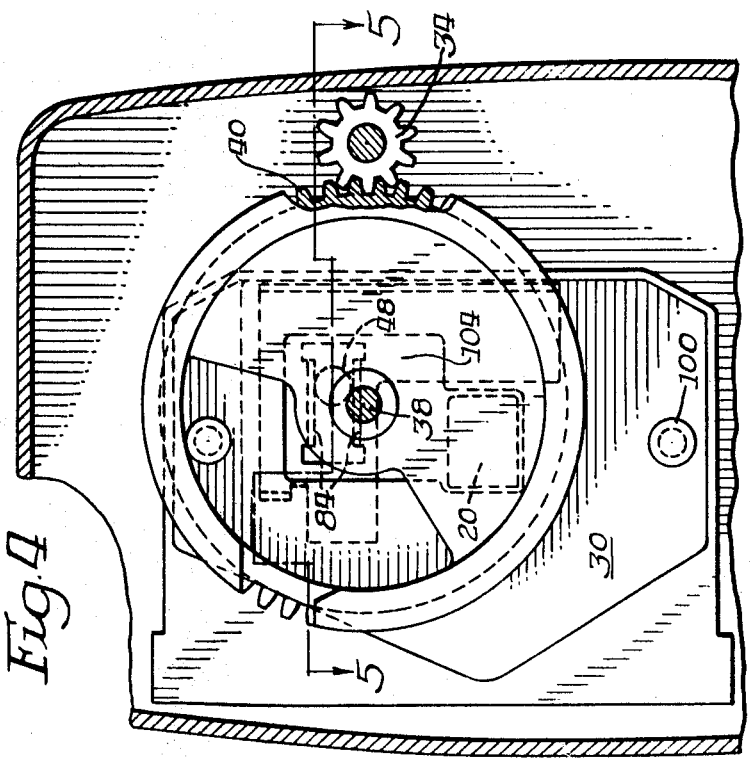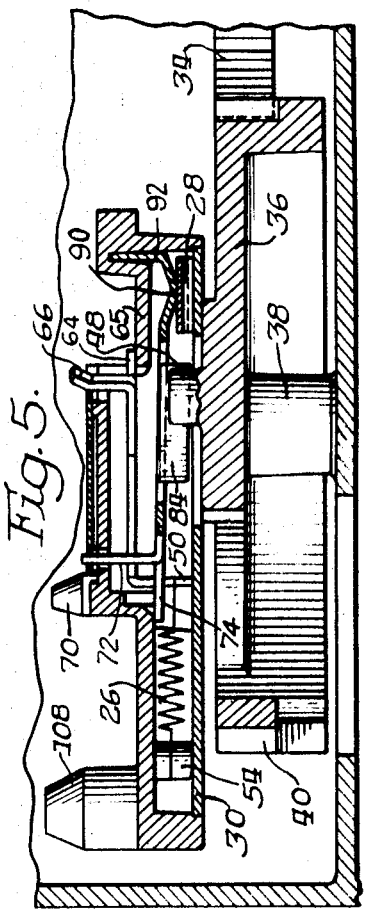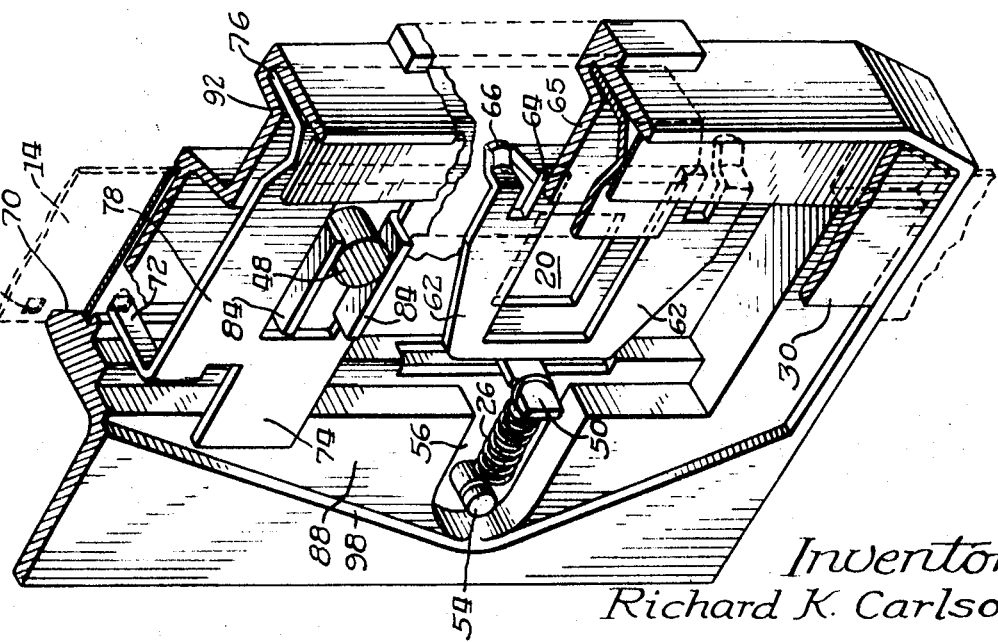

3,612,672

APERTURE ASSEMBLY AND INTERMITTENT MECHANISM FOR A CAMERA

The present invention relates to an aperture assembly and film transport mechanism for intermittently advancing film in a camera.

Attempts have been made in the past to provide for economical manufacture of motion picture cameras of high quality. Such cameras have generally required a substantial number of individual steps for alignment of components in the aperture assembly and the shutter to obtain desired cooperation between movements of these elements and film exposure and transport.

Although high-quality cameras are available, these incorporate a large number of elements in the areas in question, and often require manual assembly of the elements due to the critical timing and sequencing thereof. To overcome the shortcomings of the known arrangements, the instant invention relates to a simplified construction of few elements which are assembled readily. After assembly, apart from the camera, the aperture assembly is inserted into position in the camera as a subassembly provided with the necessary alignment for desired cooperation with other components of the camera.

An object of the invention is to provide an aperture assembly constructed as a subassembly for mounting as a unit in a camera.

Another object of the invention is to provide an aperture assembly which cooperates with a camera shutter for timed transport and exposure of film in the camera.

Yet another object of the invention is to provide a reciprocable shuttle member having a claw portion which advances film when moving in one direction and which cams itself out of the film perforation when moving in the opposite direction.

Still another object is to provide a compact assembly for performing the foregoing functions and others, as well as being practical and economical to manufacture in quantity production.

Other objects and features inherent in the instant invention will become readily apparent to those skilled in the art, and will be understood when reference is had to the ensuring description, when interpreted in the light of the accompanying drawings, in which like numerals are used to indicate like parts, and in which:

FIG. 3 is a perspective view of the aperture assembly partially in section;

FIG. 4 is a cross-sectional view which depicts the relationship of the gear shutter member as related to the aperture in the aperture assembly; and FIG. 5 is a cross-sectional view taken substantially along line 5—5 of FIG. 4.

Figure 1:
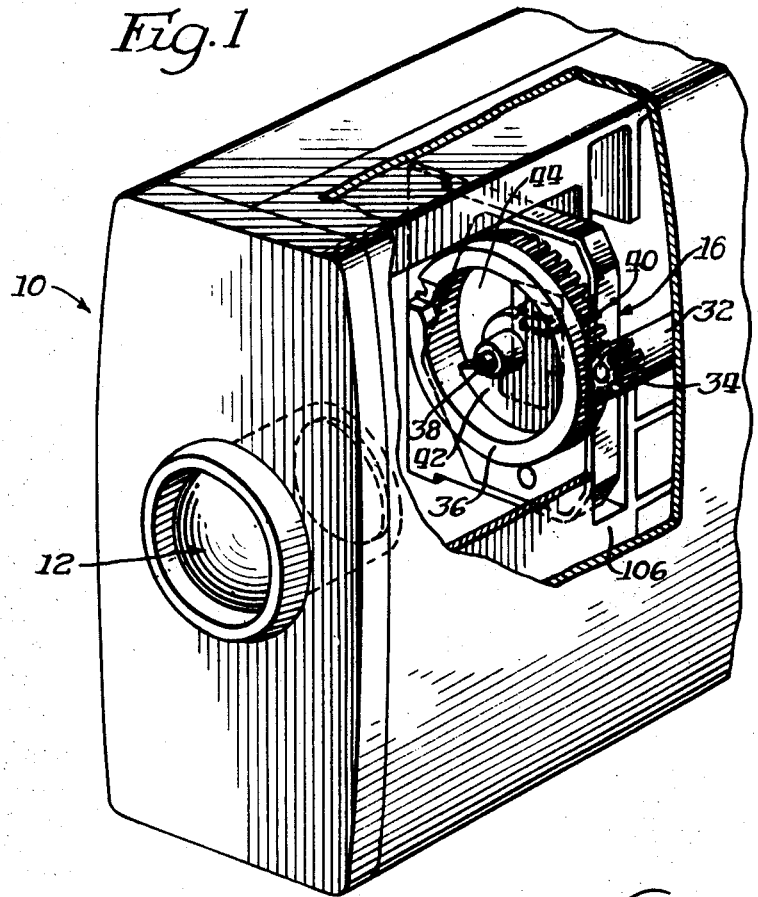
FIG. 1 is a fragmentary perspective of the front part of a camera with portions cut away in part to depict part of the internal mechanism comprising the instant invention.
Figure 2:
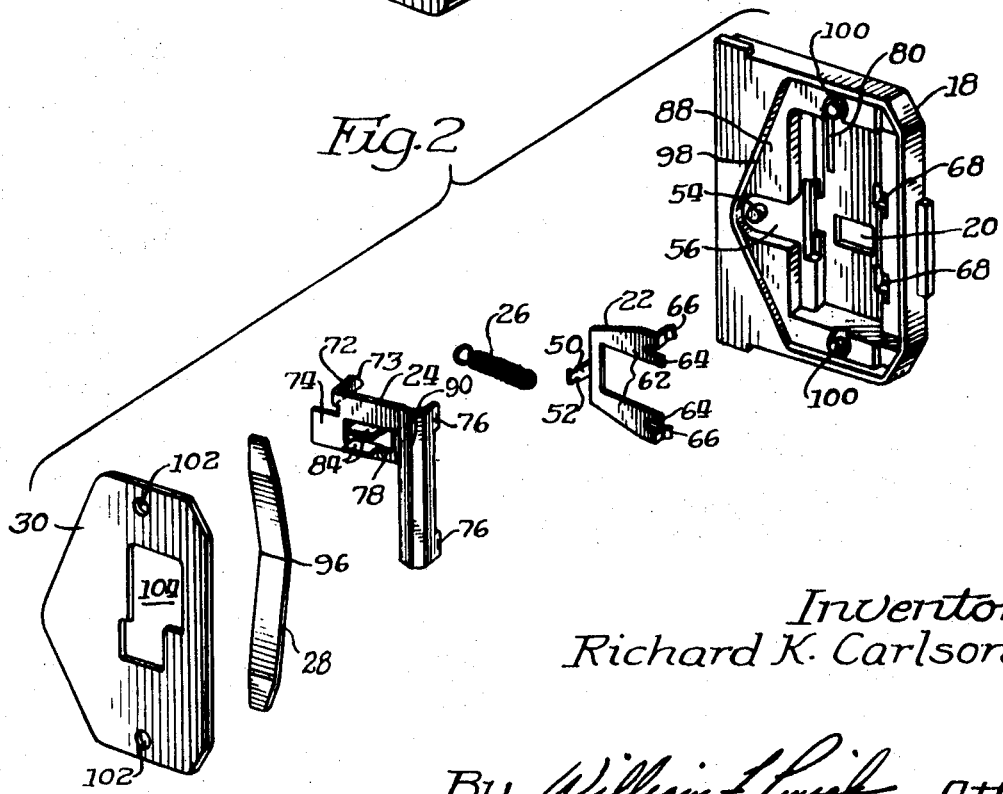
FIG. 2 is an exploded perspective view of the parts that make up the aperture assembly elements.

As seen in FIG. 1, a camera generally designated 10 includes an optical system 12 defining an optical axis along which an image is directed to impinge on a film 14, as shown in FIG. 3. Internally of the camera housing, the image passes through an aperture assembly 16 as shown in FIG. 2 which includes an aperture plate portion 18. In the plate portion is an aperture 20 defining the configuration of an image frame. The frame plate portion 18 of assembly 16 further encloses a tensioned film side guide member 22, a reciprocatable shuttle plate member 24, a coiled spring 26 and a leaf spring member 28. The components are enclosed within the frame plate portion by a cover plate 30 so that the assembly is insertable as a unit into operating position in the camera.

Drive for the shuttle plate of the aperture assembly is transmitted from a prime mover (not shown) which is geared or otherwise connected to a drive shaft 32 on which a pinion 34 is carried as seen in FIG. 1. Pinion 34 is arranged in drive transmission relationship with a shutter disk 36, supported for rotation about a bearing axis 38, and having gear teeth 40 peripherally surrounding the disk. Internally, the disk is formed with an opaque light-blocking sector 42 and an open exposure-permitting sector 44. A shuttle-driving pin 48 is arranged eccentrically of the shutter-supporting axis 38 and extends rearwardly of opaque sector 42 to cooperate with the shuttle for driving of the shuttle in timed sequence with the passing of the sectors of the shutter across aperture 20.

The frame plate portion 18 of aperture assembly 16 is formed internally with several levels, cutaway portions, and holes positioned relative to the aperture (for clearance with respect to components thereof). As shown in FIGS. 2 and 3, side tension guide 22 is supported within the assembly for limited transverse movement relative to the aperture. Guide 22 consists of a "U"-shaped body from which a lug portion 50 extends perpendicularly. A reduced portion 52 of the lug permits retention of an end of coiled spring 26, the other end of which spring is anchored on a lug 54 extending from a shelf 56 internally of the assembly plate 18. The side tension guide has its U legs 62 terminating in two bifurcated fingers on each leg. One finger 64 is a guide member slidably resting on bed 65 of plate 18. The other finger 66 serves as a film-engaging member and passes through holes 68 in frame 18 so as to engage the film and under the tension of spring 26 to maintain the film in firm but yieldable engagement against a rib 70. The rib extends from the rear of the assembly and defines a fixed film alignment member to prevent skewing of film in the aperture area.

The shuttle plate member 24 partially overlays side tension guide 22 and is provided with a claw 72 and aligning portions 74 and 76. Claw 72 extends perpendicularly from the planar body portion 78 of the shuttle plate 24 passes through a slot 80 in assembly plate 18. Extending oppositely to the shuttle claw relative to body portion 78 of the shuttle plate is a pair of spaced wing tabs 84 into which the eccentric pin 48 of the shutter 36 passes. The ledgelike aligning portion 74 extends laterally of the body portion beyond the tooth to engage a wall portion 88 of the assembly frame. Aligning portion 74 rides on wall portion 88 when the shuttle plate is reciprocated, and prevents the shuttle tooth 72 from passing further in a direction for penetration into film perforations 14a. The tooth is configured with a cam edge 73 for reasons hereafter explained. Along the edge of shuttle plate 24 opposite the edge from which the tooth extends, the plate is formed with an elongated "V"-like configuration 90 from which rider guide and aligning members 76 extend. Aligning members 76 pass into a groove 92 formed in aperture plate portion 18 to permit longitudinal reciprocation of shuttle plate 24 while preventing lateral motion thereof. The shuttle plate is maintained with aligners 76 in groove 92 by leaf spring member 28 which has a V configuration 96 which rests on the V edge 90 of the shuttle plate.

The shuttle plate 24, leaf spring 28, side tension guide 22 and coiled spring 26 are enclosed within the aperture assembly by cover plate 30. The cover plate is configured with external peripheral dimensions complementary with internal dimensions of a rim 98 formed in assembly plate 18. During manufacture of the assembly, the cover plate is fixed to the assembly plate in a manner which may be by deforming of lugs 100 formed in the plate when cover plate 30 is aligned thereover and the lugs are passed through holes 102 in the cover plate. A cutout 104 in the cover plate permits passage of the image through aperture 20 and passage therethrough of the pair of wing tabs 84 and the eccentric pin drive 48. As so assembled, assembly 16 is mountable as a subassembly in the correct orientation in the mechanism support frame 106 of camera 10. The subassembly further includes a cassette positioner pin 108 which determines the position of a cassette and the film therein relative to the aperture 20 in the assembly.

When the camera prime mover is energized, the shutter 36 is rotated through pinion 34 and peripheral gear teeth 40. Rotation of the shutter opaque sector 42 and open sector 44 controls light passage to film 14 in the camera. The eccentric pin 48 causes the shuttle plate 24 to be reciprocated in aperture assembly 16. As the shutter opaque sector covers aperture opening 20, the shuttle plate is moved downwardly as oriented in FIG. 1. At this time, the leaf spring biases the claw 72 into a perforation of the film. Thus, the claw pulls the film to position a film frame for exposure. At the instant the open sector of the shutter passes the aperture, the claw has reached the bottom of its path and is temporarily stationary as the eccentric pin moves laterally in between the tabs 84. The pin then begins its upward motion, and reciprocates the shuttle plate upwardly when the opaque shutter sector again covers aperture 20. The cam edge 73 of the shuttle tooth or claw 72 causes the claw to cam out of the perforation of the film leaving the film fixed. Since the claw is cammed out of that perforation, it rides upwardly along the rear of the film to reach a position at which it will enter another perforation and repeat the cycle of film transport.

What is claimed is:

1. An aperture defining subassembly for a camera in which film is transported and having a mechanism support plate within the camera in which a subassembly is formed for mounting as a unit in the mechanism support plate of the camera, the subassembly comprising:
   a frame portion;
   a film-side-tensioning guide portion;
   a shuttle plate portion;
   means biasing the side guide portion laterally of the film transport path;
   means in the frame portion guiding the shuttle plate portion;
   means extending from the shuttle plate portion for engagement with the film to transport the same intermittently; and
   cover means to enclose said side guide portion and said shuttle plate portion in said frame portion.

2. A subassembly as in claim 1 wherein the side tension guide portion comprises film-engaging portions arranged externally of the frame portion for engaging an edge of the film under the urging of said biasing means.

3. A subassembly as in claim 2 wherein a fixed film guide portion is formed externally on said frame portion to provide a cooperating guide for the edge of the film opposite the edge engaged by the side tension guide portion.

4. A subassembly as in claim 1 wherein said shuttle plate comprises a shuttle tooth, spaced guide portions, and a pivot portion wherein said guide portions permit reciprocation of said plate and limit transverse shift thereof and said pivot portion permits pivotal movement.

5. A subassembly as in claim 1 wherein the camera includes a shutter defining open and closed modes of operation, the shuttle plate of the subassembly comprising means engaging a drive portion associated with said shutter for causing said shuttle plate to transport films when said shutter is in the closed mode.

6. A subassembly as in claim 5 wherein said drive-engaging means of said shuttle cooperates with an eccentric portion of said shutter for reciprocative drive as said shutter is rotated.

7. A subassembly as in claim 5 wherein said shuttle plate is guided for linear reciprocation while driven in response to rotation of said shutter.

8. A subassembly as in claim 1 comprising means to urge said film-engaging shuttle portion into engagement with the film yet yieldably permitting withdrawal thereof from the perforation of the film.

9. A subassembly as in claim 8 wherein said shuttle plate portion includes a configuration against which said biasing portion rides in low frictional engagement.